(12) United States Patent
Roher et al.

(10) Patent No.: US 7,748,640 B2
(45) Date of Patent: Jul. 6, 2010

(54) STACKABLE THERMOSTAT

(75) Inventors: Michael A. Roher, Fort Wayne, IN (US); Tim Comerford, Indianapolis, IN (US); William F. Van Ostrand, Indianapolis, IN (US); Shannie Van Ostrand, legal representative, Indianapolis, IN (US); Jerry Dean Ryan, Indianapolis, IN (US)

(73) Assignee: Carrier Corporation, Farmington, CT (US)

( * ) Notice: Subject to any disclaimer, the term of this patent is extended or adjusted under 35 U.S.C. 154(b) by 636 days.

(21) Appl. No.: 11/640,626

(22) Filed: Dec. 18, 2006

(65) Prior Publication Data

US 2008/0147242 A1 Jun. 19, 2008

(51) Int. Cl.
*G05D 23/00* (2006.01)

(52) U.S. Cl. .................. 236/51; 236/94; 700/278; 361/735

(58) Field of Classification Search ............ 236/51, 236/94; 700/278; 165/200, 11.2; 340/870.17; 361/735; 337/300
See application file for complete search history.

(56) References Cited

U.S. PATENT DOCUMENTS

| | | | | |
|---|---|---|---|---|
| 3,339,043 A | * | 8/1967 | Baak | 337/298 |
| 4,889,179 A | * | 12/1989 | Merenda | 165/253 |
| 5,505,377 A | * | 4/1996 | Weiss | 236/47 |
| 5,603,451 A | * | 2/1997 | Helander et al. | 236/51 |
| 5,950,709 A | | 9/1999 | Krueger et al. | |
| 6,449,533 B1 | * | 9/2002 | Mueller et al. | 700/276 |
| 6,956,463 B2 | * | 10/2005 | Crenella et al. | 307/3 |

* cited by examiner

*Primary Examiner*—Marc E Norman
(74) *Attorney, Agent, or Firm*—Marjama Muldoon Blasiak & Sullivan LLP

(57) ABSTRACT

The invention relates to a thermostat including a user interface module. The user interface module has a display, a plurality of user interface buttons, and a first power and communications interface. The thermostat also includes an I/O module, the I/O module electrically coupled to a HVAC plant and the I/O module having a plurality of switches to control the HVAC plant, and a second power and communications interface. The user interface module and the I/O module are communicatively coupled and exchange power via the power and communications interfaces and the thermostat can be mounted and operated in one of two user selectable installations: a stacked configuration comprising a thermostat having the user interface module directly mounted to the I/O module, or a remote configuration comprising a thermostat having the user interface module remotely mounted from the I/O module.

13 Claims, 6 Drawing Sheets

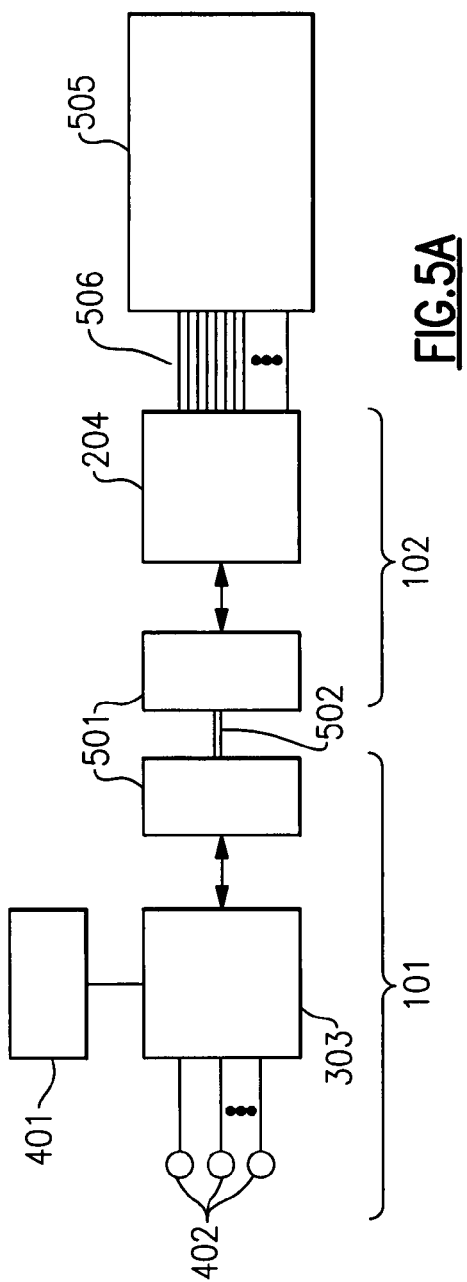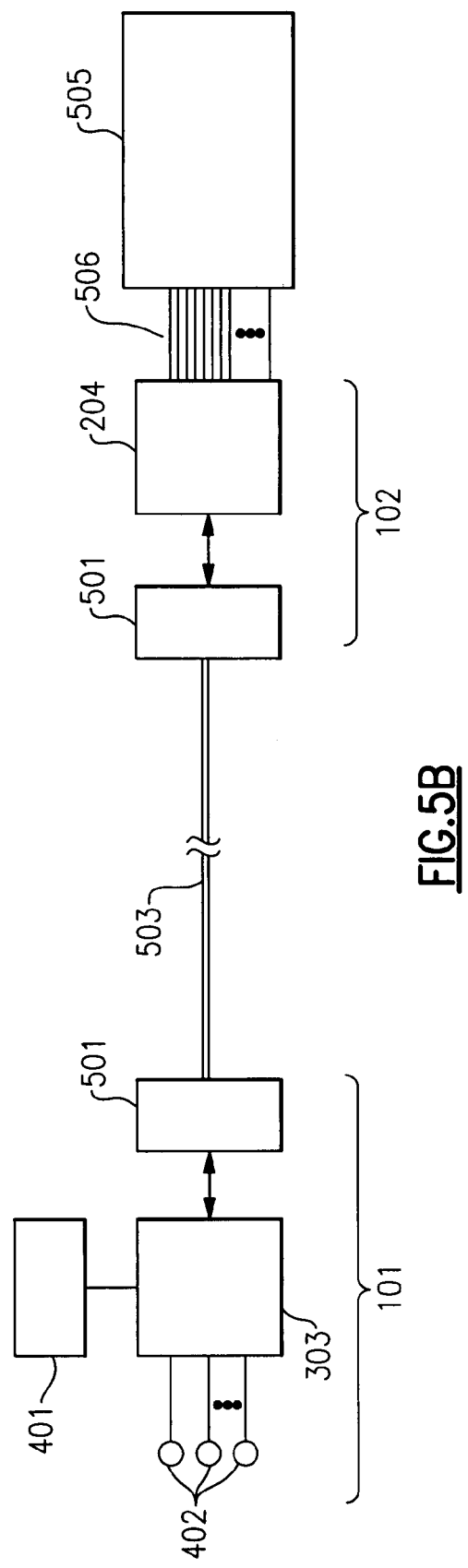

US 7,748,640 B2

STACKABLE THERMOSTAT

FIELD OF THE INVENTION

This invention relates generally to a wall mounted thermostat and more specifically to a wall mounted thermostat compatible with legacy thermostat wiring cables and occupying a smaller physical and visual presence on a wall.

BACKGROUND OF THE INVENTION

Generally comfort systems are controlled by a wall mounted thermostat. A modern wall mounted thermostat typically includes a display and a key pad including user buttons for programming the thermostat or for manually adjusting the air temperature in a space for which the thermostat controls the comfort levels. The wiring used to connect thermostats to corresponding heating, ventilation, and air conditioning (HVAC) plants varies between installations. For example, in some legacy home installations, such as those designed for the classic round thermostats, two wires were generally installed between the thermostat and a furnace. By contrast, many modern HVAC plants include a single or multi stage heating system, a humidifier, a fan control, and a single or multi stage air conditioner. Such modern installations can require up to 11 wires or more to establish full control between a digital wall mounted thermostat and the HVAC plant. In many cases, an installer upgrading a thermostat or an HVAC plant or both, has to also install new wiring between the wall where a new thermostat is to be installed and the location of the HVAC plant. In some cases, where it is only desired to upgrade the thermostat, many persons go without a thermostat upgrade merely because it is impractical to install a new multi-wire thermostat control cable.

Modern wall thermostats having significant functionality including time programmable set points, auto change over between heating and cooling, as well as built in humidity control, are presently available. Such relative complexity has been made possible both by microcomputers and the miniaturization of electronics parts in general. Yet, especially the more complex thermostats tend to fill a physical form factor that typically extends from over 1.5" to 3" out from the wall. It is not uncommon in either home or commercial settings for a person walking by such a wall mounted thermostat to accidentally come in contact with it. It can also be less aesthetically pleasing in some cases for a wall mounted thermostat to be so visually prevalent in some settings.

What is needed is a thermostat that can provide sufficient control for multiple features of an HVAC plant without requiring the replacement of an existing thermostat control cable running between a thermostat wall mount location and the HVAC plant. Also, what is required is a more aesthetically pleasing thermostat occupying a smaller visual presence as a wall mounted unit.

SUMMARY OF THE INVENTION

In one aspect, the invention relates to a thermostat including a user interface module. The user interface module has a display, a plurality of user interface buttons, and a first power and communications interface. The thermostat also includes an I/O module, the I/O module electrically coupled to a HVAC plant and the I/O module having a plurality of switches to control the HVAC plant, and a second power and communications interface. The first power and communications interface is electrically coupled to the second power and communications interface. The user interface module and the I/O module are communicatively coupled and exchange power via the first and second power and communications interfaces and the thermostat mounted and operated in one of two user selectable installations at least a selected one of: a stacked configuration comprising a thermostat having the user interface module directly mounted to the I/O module, and a remote configuration comprising a thermostat having the user interface module remotely mounted from the I/O module.

According to another aspect, the invention relates to a method for installing a thermostat where fewer pre-installed thermostat wires are available to an installer than are needed for connecting the thermostat to an HVAC plant comprising the steps of: providing pre-installed thermostat wires; providing a thermostat having two separable sections, the thermostat including a user interface module and an I/O module; locating the I/O module physically near the HVAC plant; connecting a plurality of wires between the I/O module and the HVAC plant to control the HVAC plant with the I/O module; locating the user interface module in a space where comfort levels are to be controlled by the thermostat; and connecting the user interface module to the I/O module using the pre-installed thermostat wires to facilitate communications and electrical power transfer between the user interface module and the I/O module.

BRIEF DESCRIPTION OF THE DRAWINGS

For a further understanding of these and objects of the invention, reference will be made to the following detailed description of the invention which is to be read in connection with the accompanying drawings, where:

FIG. 5A shows a simplified block diagram of a stackable thermostat used in a stacked configuration;

FIG. 5B shows a simplified block diagram of a stackable thermostat used in a remote configuration.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1A:
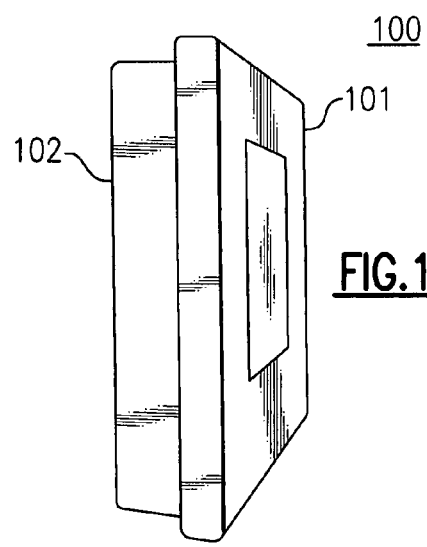
FIG. 1A shows a perspective view of one embodiment of a stackable thermostat according to the invention.

FIG. 1A shows one embodiment of a thermostat 100 according to the invention. User interface module 101 is shown as electrically and mechanically coupled to I/O module 102. In a first stacked configuration, the assembled parts can be mounted on a wall in a conventional manner, typically held to a surface of a wall by screws or other suitable fasteners. When so mounted in the stackable configuration, the two sections, user interface module 101 and I/O module 102 can typically extend out from the mounting surface in a range of about 1.5" to 3". Also, a full number of wires needed to interface to an HVAC plant (not shown in FIG. 1A) are needed to control an associated HVAC system. While the first stacked configuration is similar in some ways to a traditional wall mounted thermostat, one advantage is that in the event of a failure of the thermostat due to an electronics failure or failure caused by mechanical damage, it is very likely that only one half of the thermostat, user interface module 101 or I/O module 102 would need to be replaced, thus reducing the cost of repair.

Figure 1B:
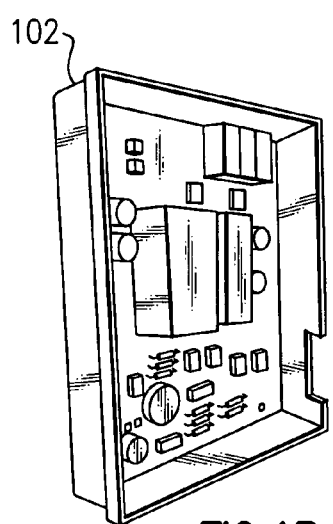
FIG. 1B shows a perspective view of an I/O module of the thermostat of FIG. 1A.
Figure 1C:
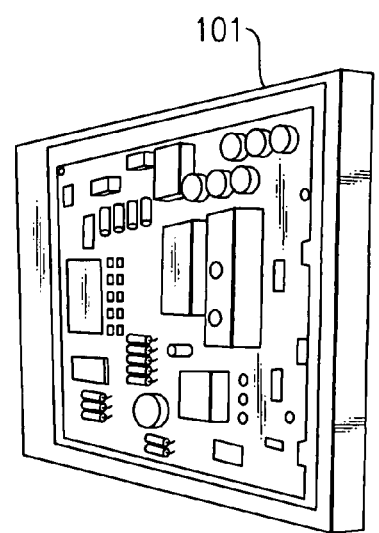
FIG. 1C shows a perspective view of a user interface module of the thermostat of FIG. 1A.
Figure 1D:
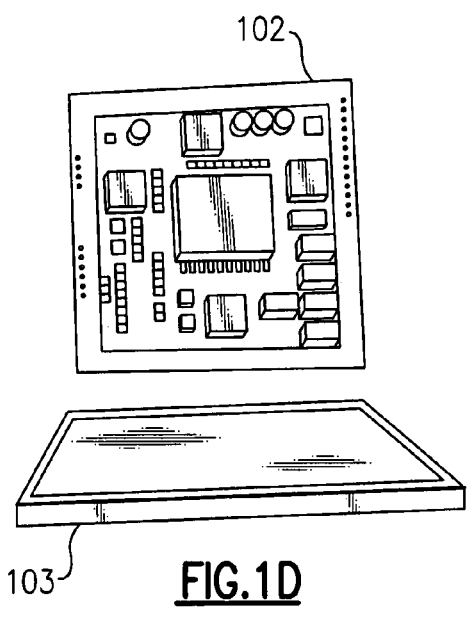
FIG. 1D shows another view of the I/O module of the thermostat of FIG. 1A including a dust cover.
Figure 1E:
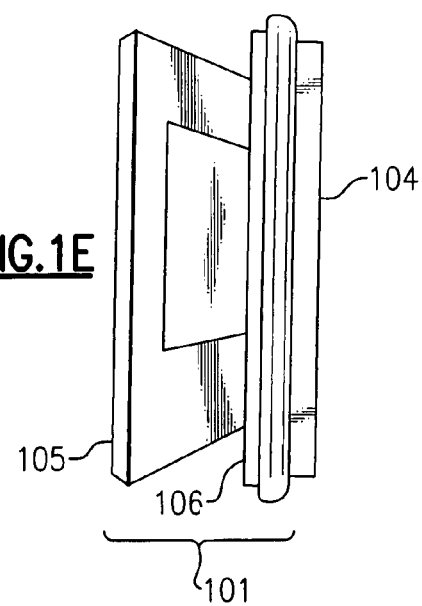
FIG. 1E shows a side view of a user interface module of the thermostat of FIG. 1A mated to a wall mounting plate.

FIG. 1B and FIG. 1C show the thermostat 100 disassembled into two discrete sections user interface module 101 and I/O module 102. While such separation can be accomplished for a repair and replacement of only one of the two sections as described above, such separation can also be accomplished for installation of the thermostat according to a second separate or remote configuration. In the second remote configuration, I/O module 102 can be mounted near an HVAC plant and wired directly to the HVAC plant using a plurality of wires. A cover 103, typically formed from plastic, can fit over the side of I/O module 102 previously covered by user interface module 101 in the first stacked configuration. Cover 103 can be fabricated so as to fit any overlaps or ridges to give a good fit. Where appropriate one or more openings, typically in the sides of the module case, can be provided for air cooling the electronic components in I/O module 102. Also, according to the second configuration, as shown in FIG. 1E, user interface module 101 can be mounted to a wall, typically a wall in the space where comfort levels are controlled by thermostat 100. A mounting plate 104 can be fabricated, such as from plastic, to fit as the I/O module 102 would fit in the first stacked configuration. However, mounting plate 104 can be far thinner than I/O module 102 resulting in a "thin" mounting installation of user interface module 101 where the entire assembled unit of user interface module 101 combined with mounting plate 104, can extend less than 1.5" from the wall. Also, as can be seen in FIG. 1E, cover 105, can be attached to a user interface module 101 base 106 including a display and user interface buttons (not shown in FIG. 1E). Cover 105 can be hinged to base 106.

From a user's point of view, it is unimportant that in the second configuration I/O module 102 has been remotely mounted near the HVAC plant. From an aesthetic point of view, however, the thin mounted installation can be more visually pleasing. Also, from a safety perspective, a unit that protrudes less distance from a wall surface is less likely to be caught or struck by a passing person or object thus reducing injury and damage to both passerby and thermostat 100. In the second remote configuration, while a full compliment of wires can be installed between I/O module 102 and the HVAC plant, fewer wires are needed to electrically couple a remotely located user interface module 101 and I/O module 102. In many embodiments of the inventive thermostat 100, as few as two wired can be used to operatively connect user interface module 101 to I/O module 102.

Figure 2:
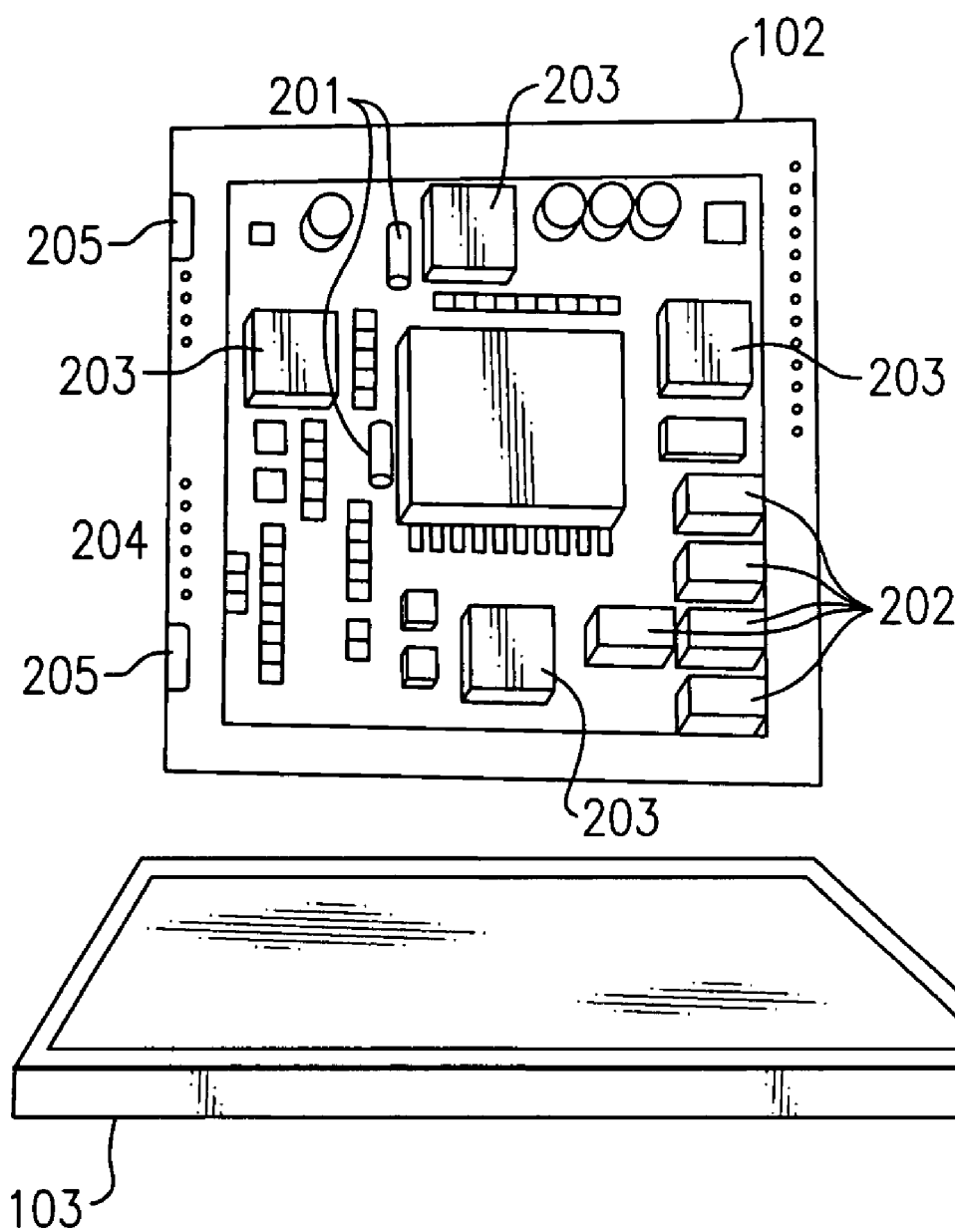
FIG. 2 shows a close up view of the I/O module of the thermostat of FIG. 1A.

Turning to FIG. 2, I/O module 102 can now be seen in more detail. Mounting holes 203 allow the I/O module 102 to be mounted to a surface, typically using screws. Any other suitable fastener can be used, including, less desirably, double sided tape. In the case of a first stacked configuration, such fasteners (not shown in FIG. 2) support both I/O module 102 and user interface module 101. In the case of the second remote mounting configuration, cover 103 can be used as a dust cover to protect the electronic components in I/O module 102. Cover 103 can be affixed to I/O module 102 using snaps 205 or other suitable fastening means including screws. Microcomputer 204 functions to facilitate communications between I/O module 102 and user interface module 101 as well as to control relays 202 to control an HVAC plant. It should also be noted that solid state switches, including for example, silicon controlled rectifiers (SCR) or field effect transistors (FET) can be substituted for relays 202 where appropriate. Other types of suitable solid state switches can be used as well. One or more terminal blocks 201 serve to accept wires from the HVAC plant as well as wires to I/O module 102 in the second remote configuration. In the first stacked configuration, wiring between I/O module 102 and user interface module 101 can be accomplished by mating pins and sockets or by a connector plugged into one or both or side sides. For example, there could be pins on a user interface module 101 circuit card to accept a plug having mating sockets. Then "pig tail" wires from the plug could be attached to two or more terminals (typically only two wires) on a terminal block 201. Other suitable methods of connecting wires between I/O module 102 and user interface module 101 can be used.

Figure 3A:
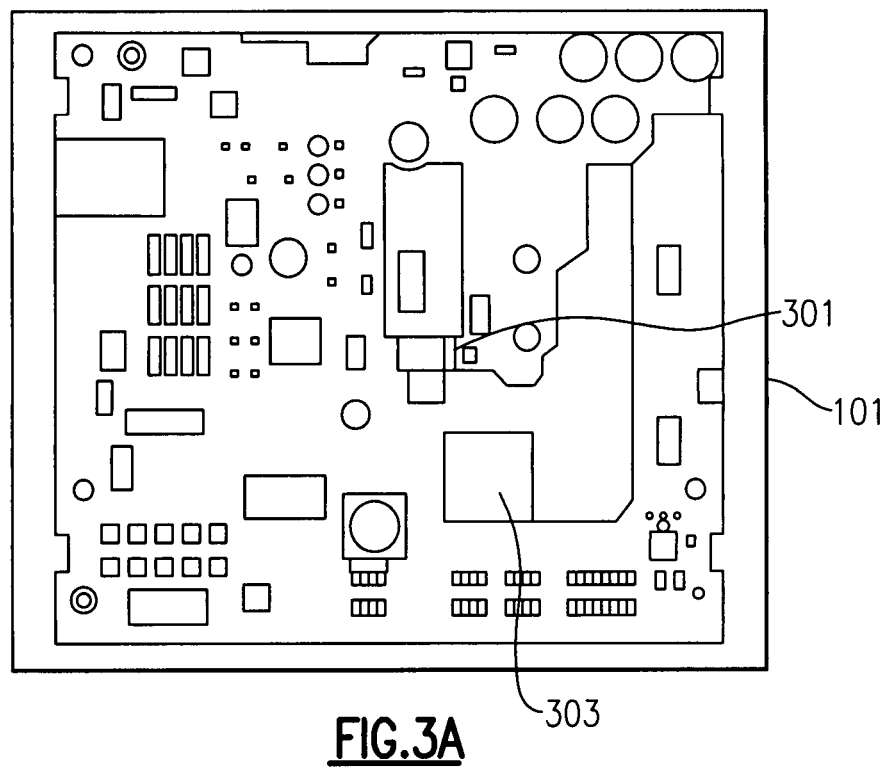
FIG. 3A shows a close up view of the circuit side user interface module of the thermostat of FIG. 1A.
Figure 3B:
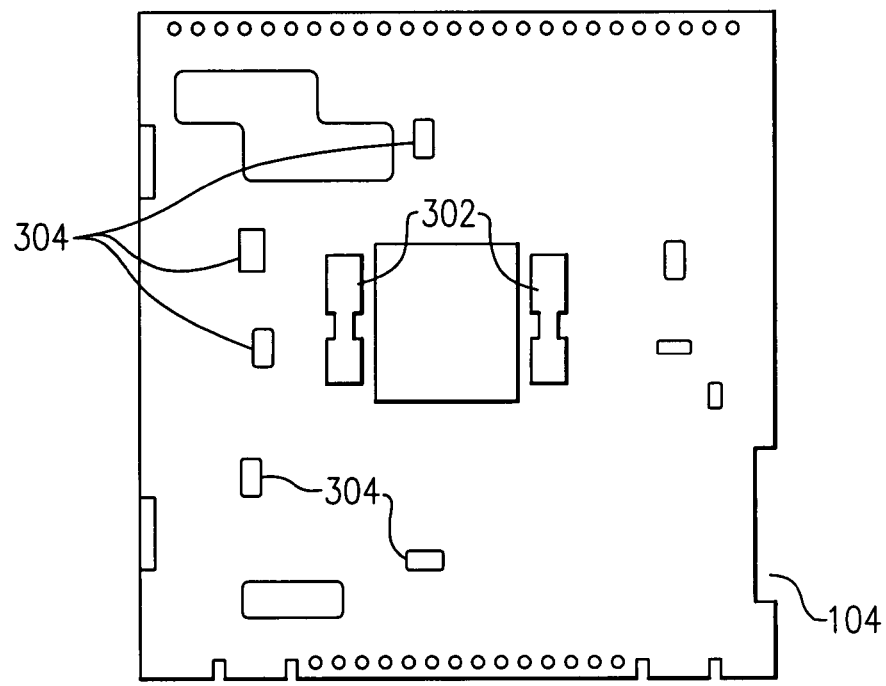
FIG. 3B shows a wall mounting plate suitable for use with the user interface module shown in FIG. 3A.

FIG. 3A shows the circuit side of one embodiment of a user interface module 101 according to the invention. Microcomputer 303 facilitates communication between user interface module 101 and I/O module 102 as well as providing user interface functionality, typically via a display and user operable keys (not shown in FIG. 3A). Socket 301, having two pins, shows one suitable type of electrical connection useful for electrically coupling user interface module 101 to I/O module 102. FIG. 3B shows a mounting plate 104 suitable for accepting and mechanically affixing user interface module 101 to a surface, typically to a wall using mounting holes 304 in the second remote configuration. Electrical connections 302 can in include screws to accept wires for electrically coupling user interface module 101 to I/O module 102. User interface module 101 can be coupled to electrical connections 302 by a conducting spring contact (not shown in FIG. 3B), electrical connector (not shown in FIG. 3B), or pig tail wires (not shown in FIG. 3B) either terminating on the circuit board of user interface module 101 or having an electrical connector, such as would be suitable to plug into connector 301.

Figure 4A:
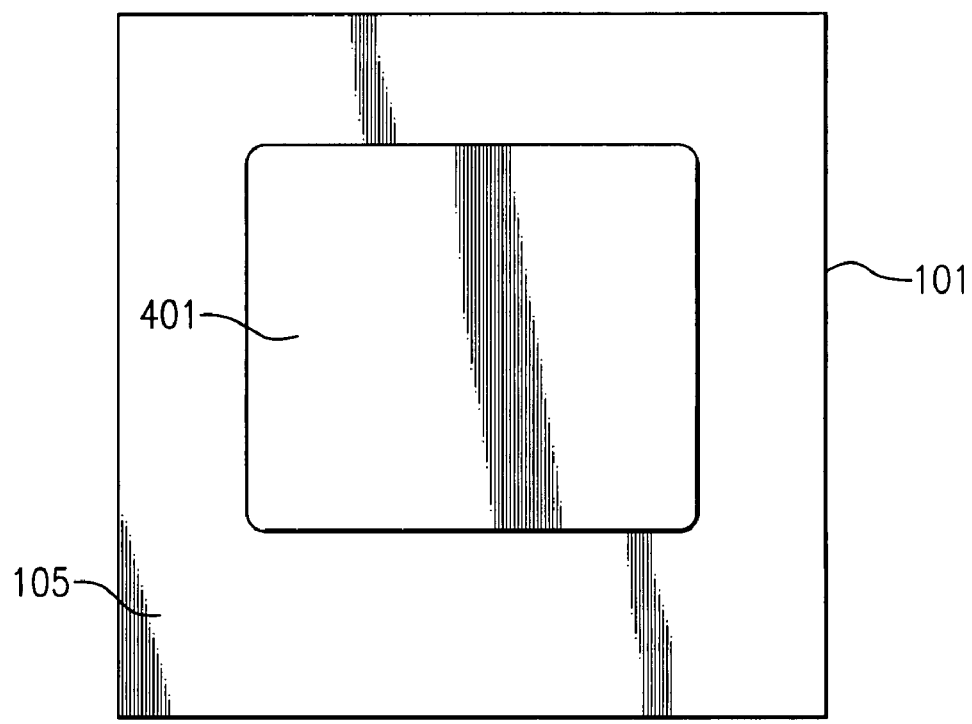
FIG. 4A shows a display side view of the thermostat of FIG. 1A.
Figure 4B:
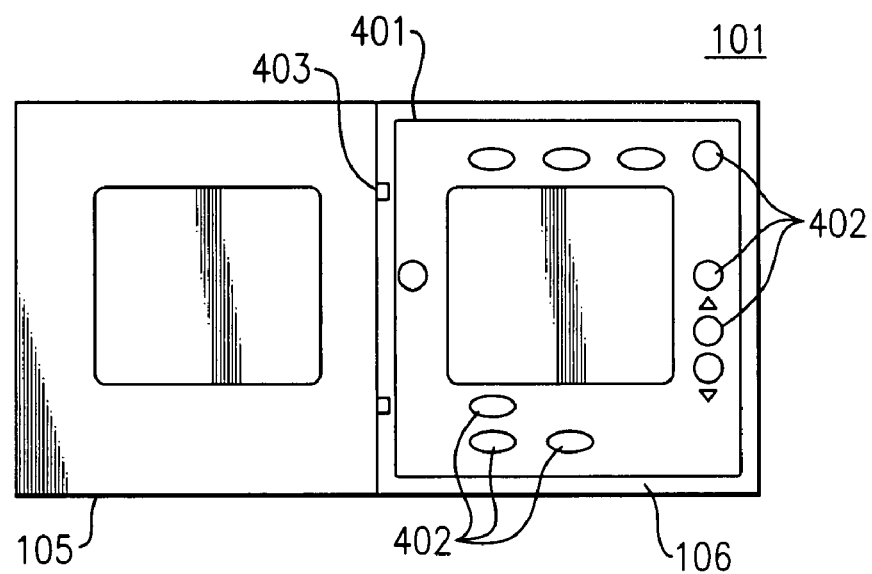
FIG. 4B shows the thermostat of FIG. 4A with the hinged cover opened.

Turning to FIG. 4A, in one exemplary embodiment, a user of thermostat 100 sees the display screen 401 and a cover 105 that can be opened such as by swinging on hinges 403 (FIG. 4B). FIG. 4B shows a view of the exemplary user interface module 101 with cover 105 opened, exposing user interface buttons 402 on user interface module 101 base 106. It should be noted that in this direct head on view, a user sees the same view in most embodiments, whether the I/O module 102 is present in a first stacked configuration, or not present in the second remote configuration.

FIG. 5 shows a simplified block diagram of one exemplary installation according to a first stacked configuration. As has been discussed, user interface module 101 typically includes a microcomputer to accept user input via thermostat user interface buttons 402 and to provide display information to a user via display 401. It is also understood that in some embodiments of the invention, display 401 can include touch sensitive user buttons. Microcomputer 303 can also facilitate communications between user interface module 101 to I/O module 102 via power and communications modules 501. In a first mounting configuration, where the user interface module 101 and I/O module 102 are stacked, a plurality of wires 506 can be run in a conventional manner, typically in a multiwire cable, between the thermostat 100 and an HVAC plant 505.

Typically two or more wires can be used to operatively connect two power and communications modules 501, one located in user interface module 101 and the other located in I/O module 102. The two power and communications modules 501 can be identical, however they need not be identical in physical or electronic configuration, so long as they are electrically compatible with each other. Typically one power and communications module 501 can be configured to supply power to another power and communications module 501 configured to receive power. While power can be sourced from either side, generally in a remote configuration, power can be more conveniently sourced from an I/O module 102 situated near the HVAC plant having ample sources of electrical power, and supplied to a remotely located wall mounted user interface module 101.

In most embodiments, two wires 502, are suitable for supplying both power and digital communications between user interface module 101 to I/O module 102. One such suitable power and communications interface was described in U.S. Pat. No. 6,956,463, "Method and apparatus for providing both power and communication over two wires between multiple low voltage AC devices", to Crenella, et. al. and assigned to the Carrier Corporation. U.S. Pat. No. 6,956,463 is hereby incorporated by reference in its entirety.

FIG. 5B shows a thermostat 100 in the second mounting configuration where I/O module 102 is remotely located from user interface module 101. Again, user interface module 101 and I/O module 102 can be coupled by as few as two wires 503. The ability of user interface module 101 and I/O module 102 to be operatively coupled by as few as two wires allows a thermostat 100 to be installed in legacy installations that only provided two electrical wires between a wall in the space where comfort settings are determined and maintained and the utility space housing a corresponding HVAC plant. Thus a completely modern digital control can be used in such legacy installations while still providing a plurality of wires 506 coupling I/O module 102 to one or more HVAC components of an HVAC plant 505.

Figure 6:
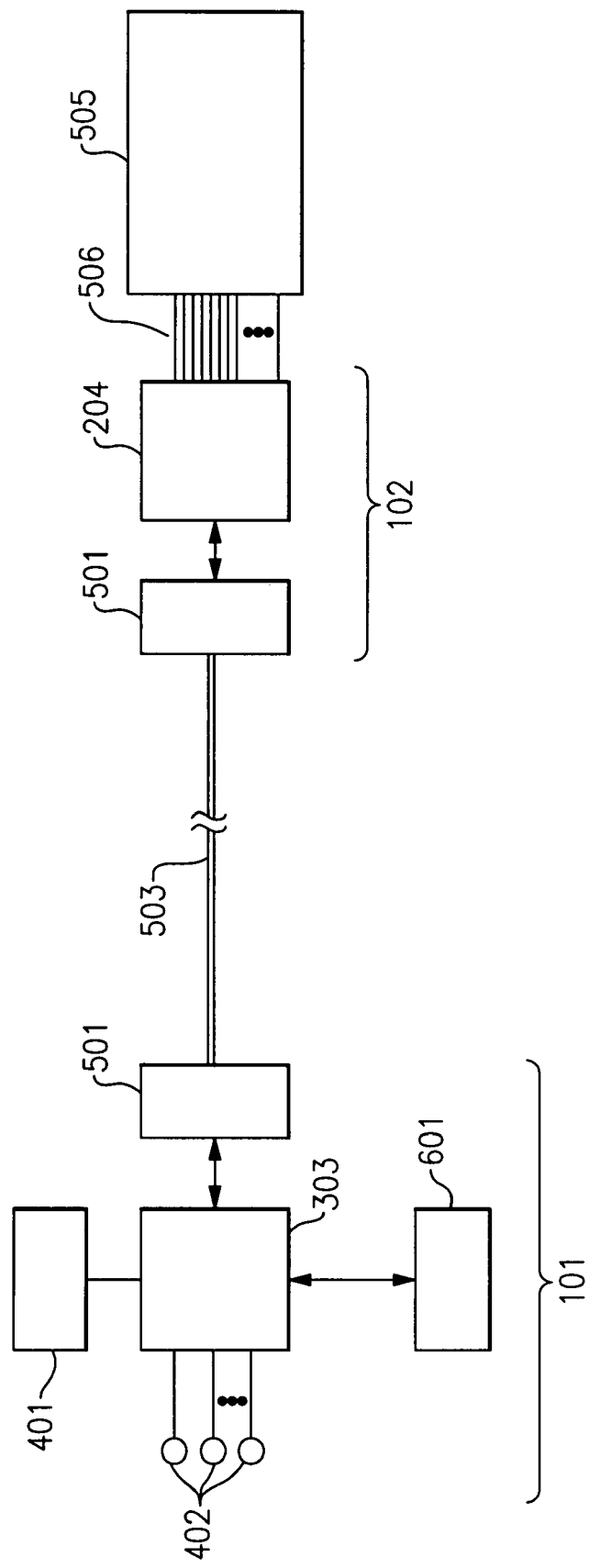
FIG. 6 shows a simplified block diagram of a stackable thermostat including a communication module.

FIG. 6 shows an embodiment of a thermostat 100 according to the invention, having additional wired or more typically wireless communications capability via a communication module 601. In one exemplary embodiment, a communication module 601 can be plugged into or soldered into a circuit board on a user interface module 101. Such communications capability is described in copending U.S. patent application Ser. No. 12/521,313, entitled "Universal Thermostat Expansion Port", filed Mar. 1, 2010 and assigned to the Carrier Corporation. U.S. patent application Ser. No. 12/521,313, entitled "Universal Thermostat Expansion Port" is hereby incorporated by reference in its entirety.

The term "microcomputer", as used in reference to microcomputers 204 and 303, is defined herein as synonymous with, and interchangeable with, "microprocessor", "microcontroller", and any other integrated devices, such as "digital signal processor" (DSP) chips and "field programmable logic arrays" (FPGA) which can be programmed to perform the functions of a microcomputer.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A thermostat comprising:
a user interface module, the user interface module having a display, a plurality of user interface buttons, and a first power and communications interface; and
an I/O module, the I/O module electrically coupled to a HVAC plant, the I/O module having a plurality of switches to control the HVAC plant, and a second power and communications interface,
wherein the first power and communications interface is electrically coupled to the second power and communications interface,
wherein the user interface module and the I/O module are communicatively coupled and exchange power via the first and second power and communications interfaces with less wires than are used to electrically couple the I/O module to the HVAC plant, and
wherein the thermostat can be mounted and operated in one of two user selectable installations selected from at least one of:
a stacked configuration that comprises a thermostat, which has the user interface module directly mounted to the I/O module, and
a remote configuration that comprises a thermostat, which has the user interface module remotely mounted from the I/O module,
wherein in the remote configuration the I/O module is located in a first space that houses the HVAC plant,
wherein the user interface module is located in a second space where comfort settings are maintained, and
wherein the first space is different from the second space.

2. The thermostat of claim 1, wherein the user interface module is electrically coupled to the I/O module by only two wires.

3. The thermostat of claim 1, wherein the user interface module protrudes less than 1.5 inches from a surface when mounted in the remote configuration on a mounting plate.

4. The thermostat of claim 1, wherein the user interface buttons are provided as touch sensitive areas on the display.

5. The thermostat of claim 1, wherein the I/O module includes relays to electrically control the HVAC plant.

6. The thermostat of claim 1, wherein the I/O module includes solid state switches.

7. The thermostat of claim 6, wherein the solid state switches are Triacs or silicon controlled rectifiers.

8. The thermostat of claim 1, wherein the I/O module further comprises a dust cover when used in the remote configuration.

9. The thermostat of claim 1, wherein the user interface module further comprises a wall mounting plate when used in the remote configuration.

10. The thermostat of claim 1, wherein the first and second power and communications interfaces are configured to transmit electrical power from the second power and communications interface in the I/O module to the first power and communications interface located in the user interface module.

11. The thermostat of claim 10, wherein the I/O module is situated near the HVAC plant in the remote configuration.

12. A method for installing a thermostat where fewer pre-installed thermostat wires are available to an installer than are needed for connecting the thermostat to an HVAC plant comprising steps of:
providing pre-installed thermostat wires;
providing a thermostat having two separable sections, the thermostat including a user interface module and an I/O module;

locating the I/O module physically near the HVAC plant;
connecting a plurality of wires between the I/O module and the HVAC plant to control the HVAC plant with the I/O module;
locating the user interface module in a space where comfort levels are to be controlled by the thermostat; and
connecting the user interface module to the I/O module using pre-installed thermostat wires to facilitate communications and electrical power transfer between the user interface module and the I/O module,
wherein the number of pre-installed wires is less than the number of wires that are used to electrically couple the I/O module to the HVAC plant,
wherein the thermostat can be mounted and operated in one of two user selectable installations selected from at least one of:

a stacked configuration that comprises a thermostat, which has the user interface module directly mounted to the I/O module, and a remote configuration that comprises a thermostat, which has the user interface module remotely mounted from the I/O module, wherein in the remote configuration the I/O module is located in a first space that houses the HVAC plant, wherein the user interface module is located in a second space where comfort settings are maintained, and wherein the first space is different from the second space.

13. The method of claim 12, wherein the step of providing pre-installed thermostat wires comprises the step of providing only two pre-installed thermostat wires.

* * * * *